(12) United States Patent
Karaoguz

(10) Patent No.: US 7,308,251 B2
(45) Date of Patent: Dec. 11, 2007

(54) LOCATION-BASED AUTHENTICATION OF WIRELESS TERMINAL

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 136 days.

(21) Appl. No.: 10/993,063

(22) Filed: Nov. 19, 2004

(65) Prior Publication Data

US 2006/0111125 A1    May 25, 2006

(51) Int. Cl.
*H04M 1/66* (2006.01)
(52) U.S. Cl. .................. 455/411; 455/410; 455/456.1; 455/456.3
(58) Field of Classification Search ................ 455/411, 455/410, 456.1, 456.3, 419, 420, 435.1; 380/229, 380/270; 340/5.8
See application file for complete search history.

(56) References Cited

U.S. PATENT DOCUMENTS

| | | | | |
|---|---|---|---|---|
| 2002/0080968 | A1* | 6/2002 | Olsson | 380/270 |
| 2002/0137524 | A1* | 9/2002 | Bade et al. | 455/456 |
| 2003/0216143 | A1* | 11/2003 | Roese et al. | 455/456.1 |
| 2003/0216144 | A1* | 11/2003 | Roese et al. | 455/456.1 |
| 2004/0023666 | A1* | 2/2004 | Moon et al. | 455/456.1 |
| 2004/0157620 | A1* | 8/2004 | Nyu | 455/456.1 |
| 2004/0185842 | A1* | 9/2004 | Spaur et al. | 455/420 |
| 2004/0203900 | A1* | 10/2004 | Cedervall et al. | 455/456.1 |
| 2004/0224702 | A1* | 11/2004 | Chaskar | 455/456.3 |
| 2004/0248551 | A1* | 12/2004 | Rowitch et al. | 455/410 |
| 2005/0026596 | A1* | 2/2005 | Markovitz | 455/411 |
| 2005/0038876 | A1* | 2/2005 | Chaudhuri | 709/219 |
| 2005/0148342 | A1* | 7/2005 | Sylvain | 455/456.3 |

* cited by examiner

*Primary Examiner*—Joseph Feild
*Assistant Examiner*—Huy D. Nguyen
(74) *Attorney, Agent, or Firm*—Garlick Harrison & Markison; Bruce E. Garlick

(57) ABSTRACT

A wireless terminal receives an operation request from a user and accesses a plurality of location based access rules based upon the operation request, each location based access rules including a location parameter and corresponding authentication requirements. A location of the wireless terminal is determined. A location based access rule from the plurality of location based access rules is selected based upon the location. The wireless terminal prompts the user to meet the corresponding authentication requirements. When the user meets the corresponding authentication requirements of the selected location based access rule, the wireless terminal satisfies the operation request. When the user does not meet the corresponding authentication requirements of the selected location based access rule, the operation request is denied. In an alternate embodiment, access to the requested operation is either granted or denied based upon the location of the wireless terminal.

30 Claims, 6 Drawing Sheets

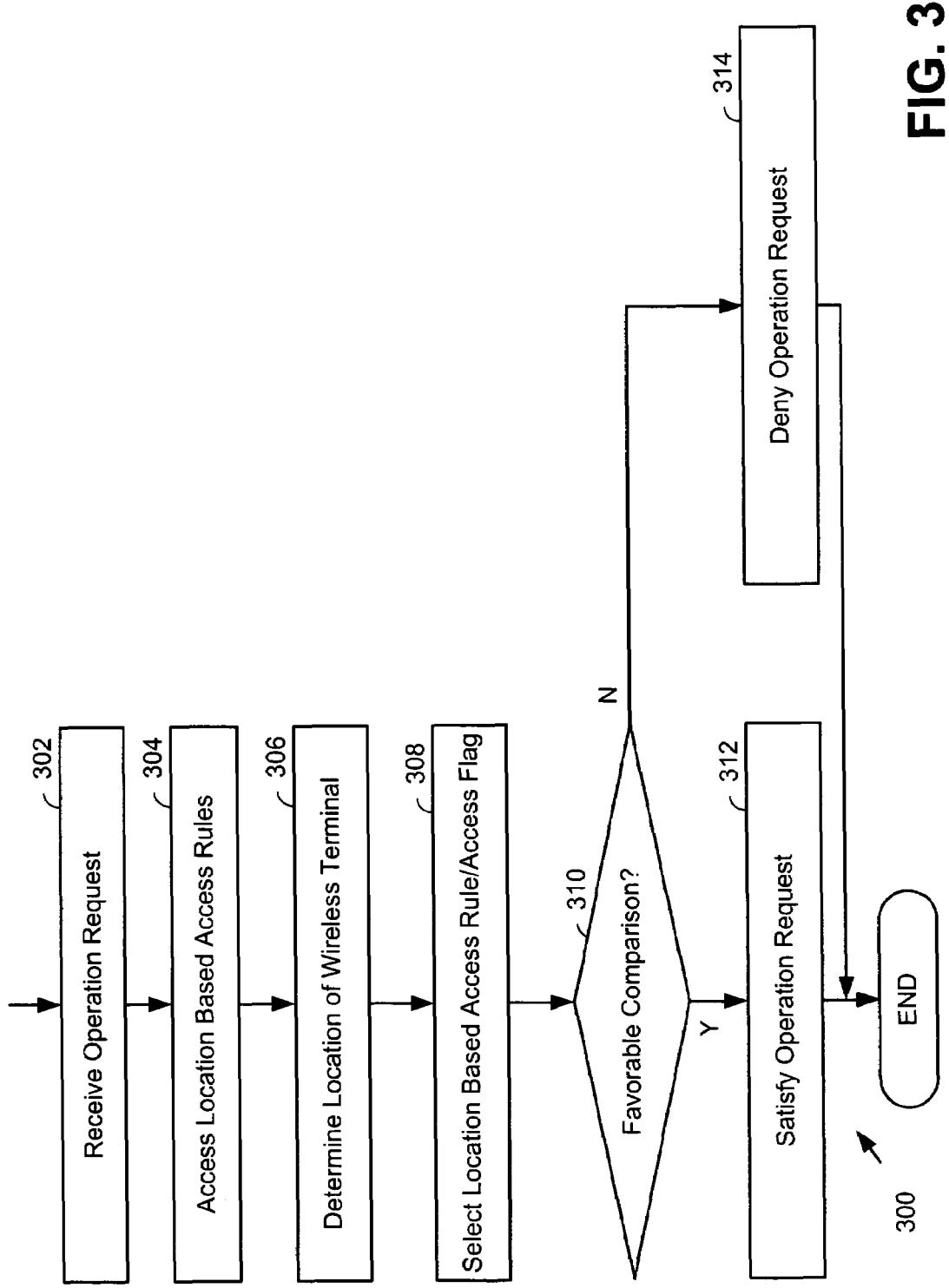

LOCATION-BASED AUTHENTICATION OF WIRELESS TERMINAL

FIELD OF THE INVENTION

The present invention relates generally to wireless communications; and more particularly to the operation of a wireless terminal.

BACKGROUND OF THE INVENTION

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Local Area Networks (WLANs), Wireless Personal Area Networks (WPANs), and other networks that employ a wireless link between a serviced terminal and a network infrastructure. Of course, many communications are serviced using a combination of wireless communication systems and wired communication systems.

Wireless communication systems support mobility of a serviced wireless terminal. In cellular wireless communication systems, a cellular telephone may roam across wide areas and still receive service. In the United States, many service providers support nationwide roaming of cellular telephones. Such is also the case in Europe and other countries across the globe. WLANs support wireless terminals within a WLAN service area. WLAN service areas are typically established, using Wireless Access Points (WAPs) and a backbone network, to service a premises such as an office complex, a coffee shop, an airport lounge, a home, etc. Wireless terminals may roam from WLAN service area to WLAN service area. WPANs typically service communications between wireless devices at a maximum distance of 10 feet. WPAN wireless terminals typically have the ability to establish WPAN communications with any proximate servicing host/peer device.

Many security issues exist with regard to wireless terminals. Wireless transmissions between a wireless terminal and its servicing base station, WAP, or host device/peer device propagate wireless. Other terminals in the vicinity can easily intercept these transmissions without permission, listen to the contents of the communication, collect information, and later use the information. Further, because of their size, wireless terminals are often lost or misplaced and retained by unauthorized users. An unauthorized user of the wireless terminal typically has use of the wireless terminal until the theft is discovered and the service for the wireless terminal is ceased. The wireless terminal may be used to access the owner's confidential information, including, for example bank account numbers, access codes, security codes, and other confidential information. A thief may be able to access the funds of the user simply by having possession of the wireless terminal. By intercepting transmissions and extracting this information therefrom, similar breaches may be performed. Thus, a need exists to prevent unauthorized access to the wireless terminal in the operations it supports.

SUMMARY OF THE INVENTION

In order to overcome the shortcomings of the prior devices, among other shortcomings, a wireless terminal constructed according to the present invention includes a wireless interface, a user interface, and a processing unit. The wireless terminal may also include a global positioning system (GPS) receiver and will further also include a battery and other components generally known. The wireless terminal may be one of a cellular telephone, a wireless personal area network (WPAN) terminal, a wireless local area network (WLAN) terminal, or another type of terminal that supports wireless communications with a supporting infrastructure. According to the present invention, the wireless terminal operates to provide authentication and limited access to its operations based upon location information.

According to one embodiment of the present invention, the wireless terminal operates to receive an operation request from a user. This operation request may seek to access a feature provided by the wireless terminal, to access a servicing network via the wireless terminal, to access a remote device via the wireless terminal, to access functions provided by the wireless terminal including, for example, address directory functions, calendar functions, and application program functions, among other operations supported. After receiving the request from the user, the wireless terminal accesses a plurality of location based access rules based upon the operation request. Each location based access rule of the plurality of location based access rules includes a location parameter and corresponding authentication requirements. Operation continues in determining a location of the wireless terminal. In determining the location of the wireless terminal, the wireless terminal may access its Global Positioning System (GPS) receiver to receive a current location. Alternately, the wireless terminal may access a servicing wireless network, send a location determination request message to the servicing wireless network and receive a location determination response message from the servicing wireless network that includes the location.

After determining the location of the wireless terminal, operation includes selecting a location based access rule from the plurality of location based access rules based upon the location. Then, the wireless terminal prompts the user to meet the corresponding authentication requirements. Such authentication requirements may include a password request, a voice recognition request, an iris pattern match request, or other requirements that would allow the user to be authenticated. When the user meets the corresponding authentication requirements of the selected location based access rule, the wireless terminal satisfies the operation request. However, when the user does not meet the corresponding authentication requirements of the selected location based access rule, the operation request is denied.

According to the operation of the present invention, the wireless terminal may determine that the user has previously met the corresponding authentication requirements of the selected location based access rule. In such case, when the authentication requirements have previously been met, the wireless terminal will not prompt the user with the corresponding authentication requirements. However, if the user has not previously met the corresponding authentication requirements, operation includes then prompting the user to meet the corresponding authentication requirements.

The plurality of location based access rules will typically be determined by the user according to his or her location traffic patterns. For example, most working people typically divide their time between the home, the office, locations relating to non-working function, and locations relating to working functions. Thus, the user may choose to establish authentication location based access rules for each of these commonly visited locations and general rules when outside of one of these areas. For example, the user may presume that the home is secure and that the usage of the wireless terminal within the home is typically authentic. However, the user may further understand that usage within the home may be limited to certain operations supported by the wireless terminal and will deny access or request further authentication to access sensitive work related functions/features/accesses. Thus, particular location based access rules will be set for the operations supported by the wireless terminal for the home location. Likewise, the user may establish different location based access rules for the physical location of his office, of work related locations, and non-work related locations. For example, access to some application supported by the wireless terminal may be password protected when outside of the office but not password protected when in the office. The user may establish these access rules via interaction with a server computer that is communicatively coupled to the wireless terminal. In such case, the server computer downloads the plurality of location based access rules to the wireless terminal via wired and the wireless communication paths. In still another embodiment, the location based access rules are stored on the server computer and retrieved when used.

According to another embodiment of the present invention, the wireless terminal receives an operation request from the user. The wireless terminal then accesses a plurality of location based access rules based upon the operation request. Each location based access rule includes a location parameter and an access flag. The wireless terminal then determines its location. Based upon the determined location, the wireless terminal selects the location based access rules from the plurality of location based access rules. The selected location based access rule has a selected access flag. The wireless terminal then compares the selected access flag to an access flag rule. When this compares and is favorable, the wireless terminal satisfies the operation request. However, when the comparison is unfavorable, the wireless terminal denies the operation request. As contrasted to the first embodiment of the present invention, with the second embodiment, access to operations of the wireless terminal is based solely upon the location of the wireless terminal. With the first embodiment, the location of the wireless terminals determines authentication requirements that must be met to access the requested operation. Other features and advantages of the present invention will become apparent from the following detailed description of the invention made with reference to the accompanying drawings.

BRIEF DESCRIPTION OF THE DRAWINGS

FIG. 3 is a flow chart illustrating operation according to a second embodiment of the present invention;

DETAILED DESCRIPTION OF THE DRAWINGS

Figure 1:
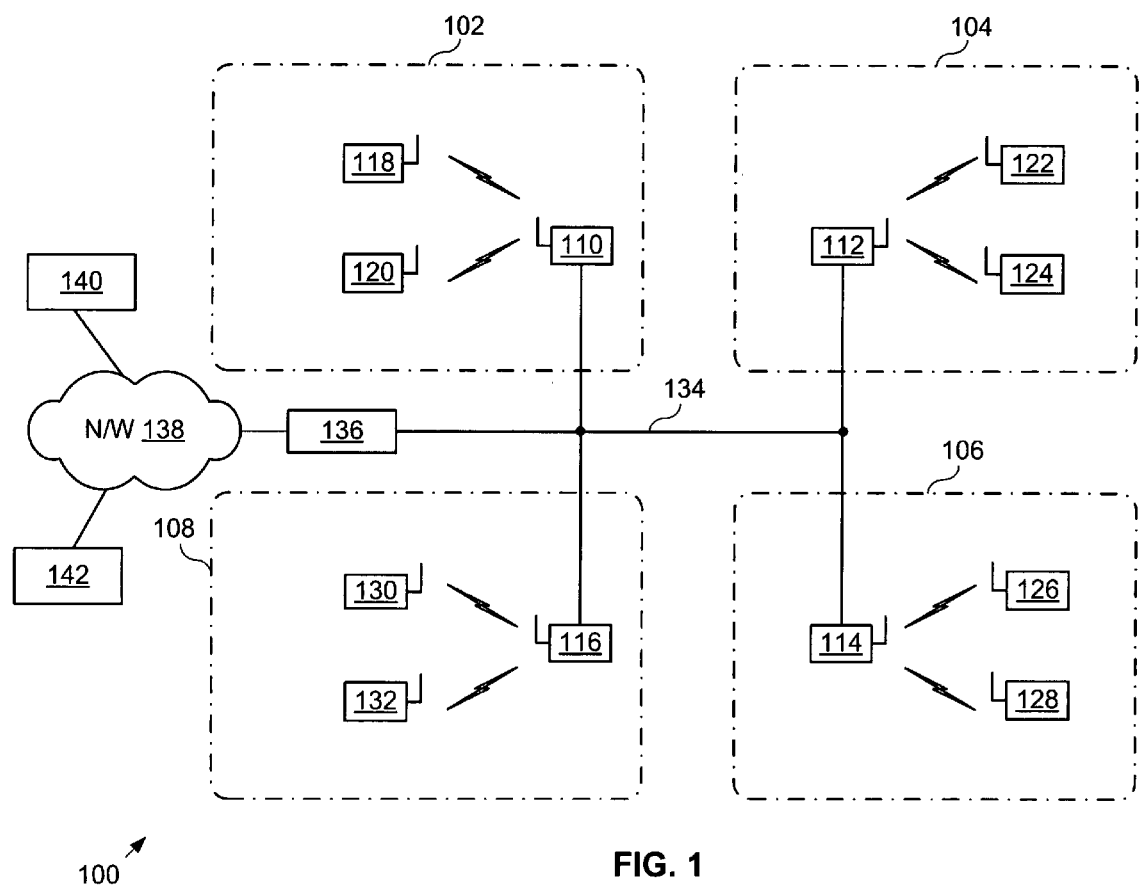
FIG. 1 is a system diagram illustrating a wireless communication system that services a wireless terminal operating according to the present invention.

FIG. 1 is a system diagram illustrating a wireless communication system that services a wireless terminal operating according to the present invention. The wireless communication system 100 of FIG. 1 shows diagrammatically location areas 102, 104, 106, and 108. Each of these location areas 102-108 may correspond to a traffic pattern of the wireless terminal. For example, location area 102 may correspond to an office building in which a user of the wireless terminal works. Likewise, location area 104 may correspond to the user's home. Further, location area 106 may correspond to one or more locations that the user frequents during working hours. Finally, location area 108 may correspond to an area or location that the user frequents during non-working times, e.g., a church, a local bar, restaurants, or other locations that the user frequents while not working. Each of the location areas 102-108 includes one or more servicing base stations or wireless access points (WAPs). For example, location area 102 includes base station/WAP 110. Likewise, location area 104 includes base station/WAP 112, location area 106 includes base station/WAP 114, and location area 108 includes base station/WAP 116. The reader should understand that the structure of FIG. 1 is used only to convey the principles of the present invention and it is not intended to be a detailed description of a cellular wireless communication system, a Wireless Local Area Network (WAN), or a Wireless Personal Area Network (WPAN).

As is shown, base station/WAP 110 supports wireless terminals 118 and 120 when in location area 102. Likewise, base station/WAP 112 supports wireless terminals 122 and 124 when in location area 104. Further, base station/WAP 114 supports wireless terminals 126 and 128 when in location area 106. Finally, base station/WAP 116 supports wireless terminals 130 and 132 when in location area 108. The base station/WAPs 110, 112, 114, and 116 are serviced via network backbone 134 and interface device 136. The interface device 136 couples the backbone network 134 to another network 138. The other network 138 may include a local area network, a wide area network, the Internet, or any other type of network that couples the network backbone 134 via the network interface 136 to computers or terminals 140 and 142.

According to the present invention, each wireless terminal 118-132 may limit access to its supported operations based upon its location. For example, when terminal 118 is serviced within location area 102, it may have a different set of location based access rules than when located in location area 106. According to a first embodiment of the present invention, each access rule includes location parameters and corresponding authentication requirements. According to the first embodiment, when a user requests an operation supported by the wireless terminal, particular authentication requirements are required based upon the location of the wireless terminal. If it is known that differing, e.g., higher or lower, security is required when in a working environment, e.g., location area 102, than when in a non-working environment, e.g., location area 104, 106, or 108, the wireless terminal will implement differing security requirements when accessing the operations. Such may be required, for example, when the wireless terminal is accessible to a number of different people, and the user wishes to ensure that only he or she has access to the particular operations.

Thus, higher security requirements authentication requirements may be implemented when in a working environment than when in the home, for example. Alternately, the user of the wireless terminal may determine that the work place is secure and require no password protection for accessing certain applications.

According to the second embodiment of the present invention operations supported by the wireless terminal may be wholly unavailable when the wireless terminal is not located within an appropriate location area. For example, access to confidential company files may be denied when the wireless terminal is in a non-working location area, e.g., location areas 104, 106, and 108, or outside of any of these location areas. An example of these operations would be when particular files or terminals are not accessible via the wireless terminal when the wireless terminal is not located in the work area 102 or the home 104.

The reader will appreciate that such location based access rules may be chosen by the user based upon his or her particular traffic patterns, security requirements, and other individual considerations. As will be described further with reference to FIG. 6, the user may establish these access rules via use of a server computer 140 accessed by a client computer 142. In such case, the server computer 140 receives input from the user at the client computer 142 to establish the location based access rules. After these location based access rules are established, the server computer 140 downloads the location based access rules via network 138, interface device 136, network backbone 134, and servicing base station/WAP 110 to wireless terminal 118, for example. In another embodiment, the location based access rules are stored remotely at server 140 and are accessed as they are used.

Figure 2:
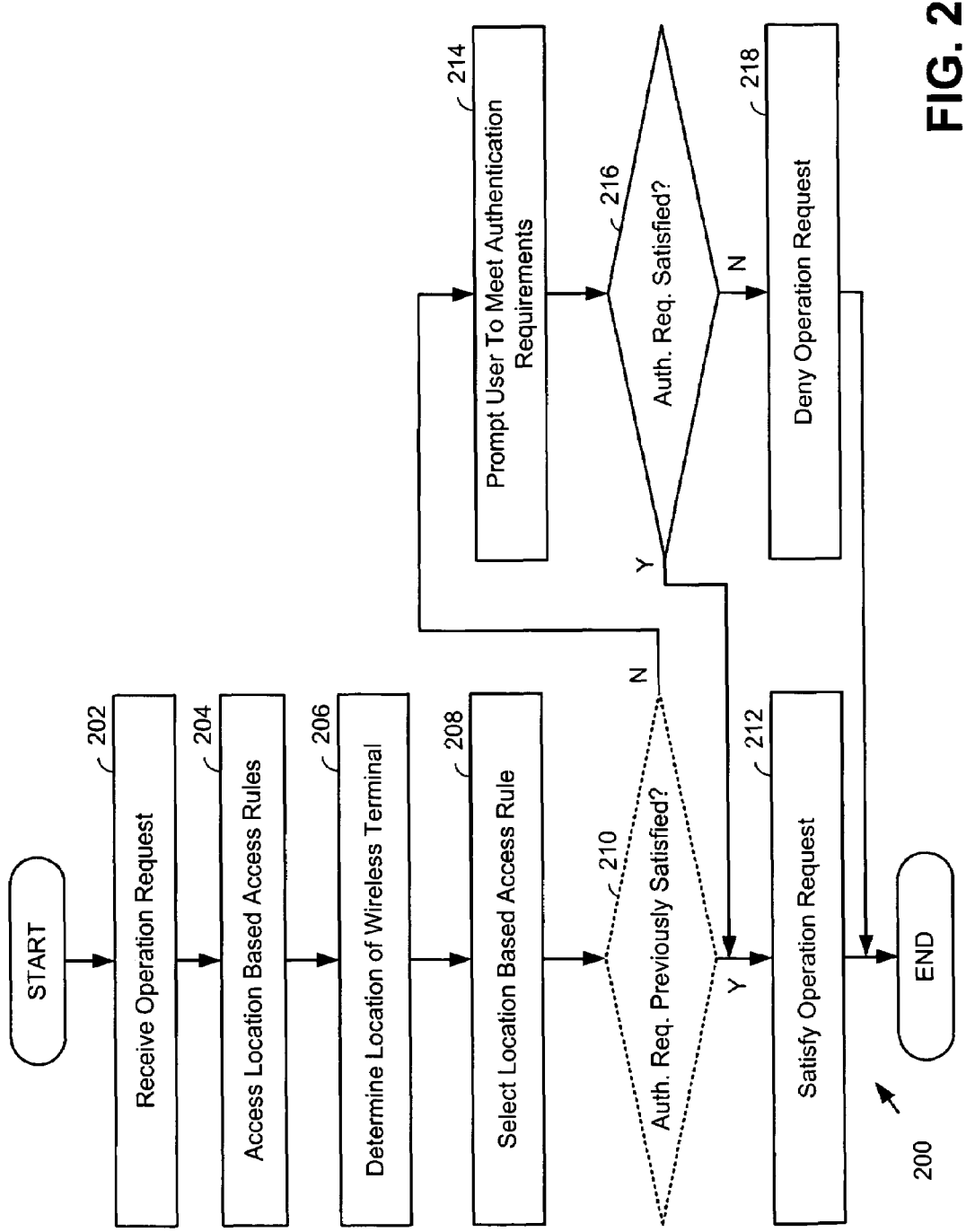
FIG. 2 is a flow chart illustrating operation according to a first embodiment of the present invention.

FIG. 2 is a flow chart illustrating operation according to a first embodiment of the present invention. The operations 200 described with reference to FIG. 2 relate to a first embodiment of the present invention. Operation commences in the wireless terminal receiving an operation request from a user (Step 202). Operation continues with the wireless terminal accessing a plurality of location based access rules based upon the operation request (Step 204). Each location based access rule of the plurality of location based access rules includes a location parameter and corresponding authentication requirements. In one instance of the present invention, these location based access rules are stored locally on the wireless terminal. However, in another instance of the present invention, the plurality of the location based access rules are stored remotely on a servicing server computer, e.g., service computer 140 of FIG. 1.

Operation continues in determining a location of the wireless terminal (Step 206). The wireless terminal then selects a location based access rule of the plurality of location based access rules based on the location (Step 208). Then, optionally, the wireless terminal determines whether the authentication requirements have been previously satisfied by the user (Step 210). If so, operation proceeds to Step 212 where the wireless terminal satisfies the operation request (Step 212). If the authentication requirements have not previously been satisfied at Step 210, the wireless terminal prompts the user to meet the authentication requirements (Step 214). Then, the wireless terminal determines whether the authentication requirements have been satisfied based upon user input (Step 216). The authentication requirements may require entry of a password by the user, satisfaction of a voice recognition pattern of the user, iris pattern recognition, or another technique that allows the wireless terminal to authenticate the particular user. When the user meets the corresponding authentication requirements of the selected location based access rule at Step 216, the operation request is satisfied at Step 212. However, when the authentication requirements are not satisfied at Step 216, the wireless terminal denies the operation request to the user (Step 218). From both Steps 212 and 218 operation ends.

FIG. 3 is a flow chart illustrating operation according to a second embodiment of the present invention. Operation commences with the wireless terminal receiving an operation request from a user (Step 302). Then, the wireless terminal accesses a plurality of location based access rules based upon the operation request (Step 304). Each location based access rule of the plurality of the location based access rules includes a location parameter and an access flag. Then, the wireless terminal determines its location (Step 306). Next, the wireless terminal selects a location based access rule of the plurality of the location based access rules based upon its location (Step 308). The location based access rule includes a selected access flag. The wireless terminal then compares the selected access flag to an access flag rule. In this comparison, the access flag rule may be a general rule or may correspond to the requested operation of the user. When this comparison is favorable at Step 310, operation proceeds to Step 312 wherein the wireless terminal satisfies the operation request of the user. However, when this comparison is not favorable at Step 310, the wireless terminal denies the operation request of the user (Step 314). From both Steps 312 and 314 operation ends.

Thus, according to the embodiment of the present invention illustrated in FIG. 3, operations of a wireless terminal are granted or denied based upon the wireless terminal location alone. Referring to both FIGS. 1 and 3, when a wireless terminal 120 resides within the location area 102 corresponding to work, the user may determine that access to particular operations is permitted, perhaps with authentication requirements (embodiment of FIG. 2). When the wireless terminal 120 is not within the work area location 102, the user may set a location based access rule such that the operations are not accessible. Thus, as contrasted to the first embodiment illustrated with reference to FIG. 2, the second embodiment of FIG. 3 either grants or denies access to operations of the wireless terminal based solely upon its location.

Referring to both FIGS. 2 and 3, the operation request may include, for example, a request to access a feature provided by the wireless terminal, a request to access a servicing network via the wireless terminal, a request to access a remote device via the wireless terminal, and a request to access functions provided by the wireless terminal including at least directory functions, calendar functions and application program functions, among other operations supported by the wireless terminal. Of course, these operations are not exhaustive and the reader will appreciate that the principles of the present invention may be applied to other features and operations supported by wireless terminals as well.

Figure 4B:
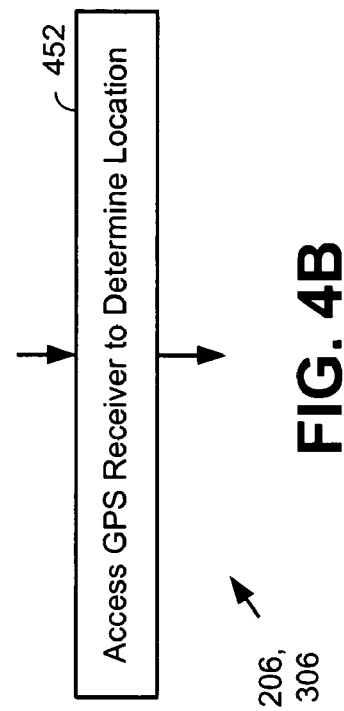
FIGS. 4A and 4B are flow charts illustrating particular techniques for determining a location of a wireless terminal operating according to the present invention.
Figure 4A:
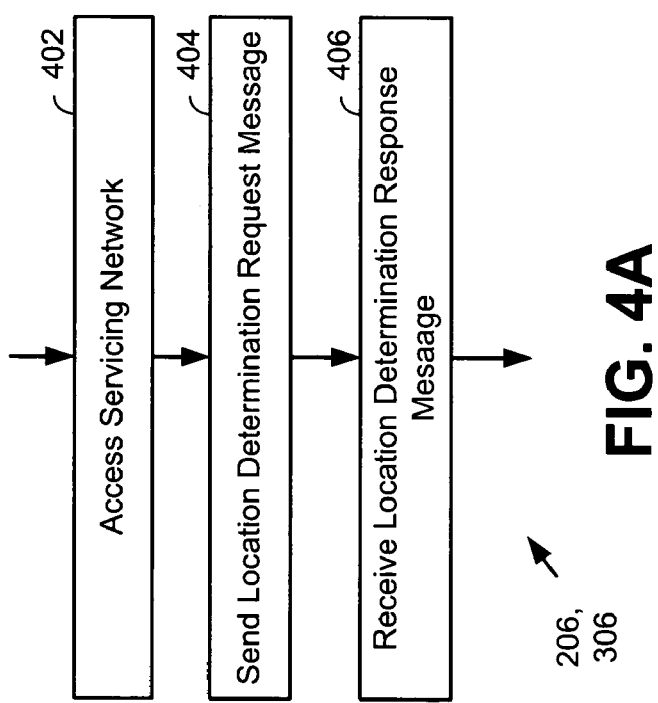

FIGS. 4A and 4B are flow charts illustrating particular techniques for determining a location of a wireless terminal operating according to the present invention. FIG. 4A illustrates a first embodiment of Steps 206 and 306 of FIGS. 2 and 3, respectively. In determining its location, the wireless terminal may access a servicing network (Step 402). After access is secured, the wireless terminal sends a location determination request message to the servicing network (Step 404). In response to the location determination request message, the wireless terminal receives a location determination response message (Step 406). Contained in the location determination response message is the location of the wireless terminal.

When the present invention is applied within a cellular network, the cellular network determines within which sector or cell the wireless terminal is currently being serviced. Based upon this information, the servicing cellular network determines with some accuracy, the location of the wireless terminal and returns it to the wireless terminal. In the case of a WLAN, a servicing WAP (or WLAN controller) knows its physical locations within the WLAN service area. Based upon this knowledge the servicing WAP may report the location to the wireless terminal. Sectorizations serviced by the WAP or directional antenna features may further allow the WAP to more precisely determine the location of the wireless terminal. Likewise, within a WPAN, a master WPAN device, e.g., a host computer system knows its physical location if programmed and can tell the wireless terminal its approximate location. This information will be returned to the wireless terminal at Step 406.

Referring now to FIG. 4B, another embodiment according to the present invention requires that the wireless terminal has a Global Positioning System (GPS) receiver contained therein. In this embodiment, Steps 206 or 306 of FIGS. 2 and 3, respectively, the wireless terminal simply accesses its GPS receiver to determine its location (Step 452). This location information will typically be more precise than that that is available via the operations of FIG. 4A.

Figure 5:
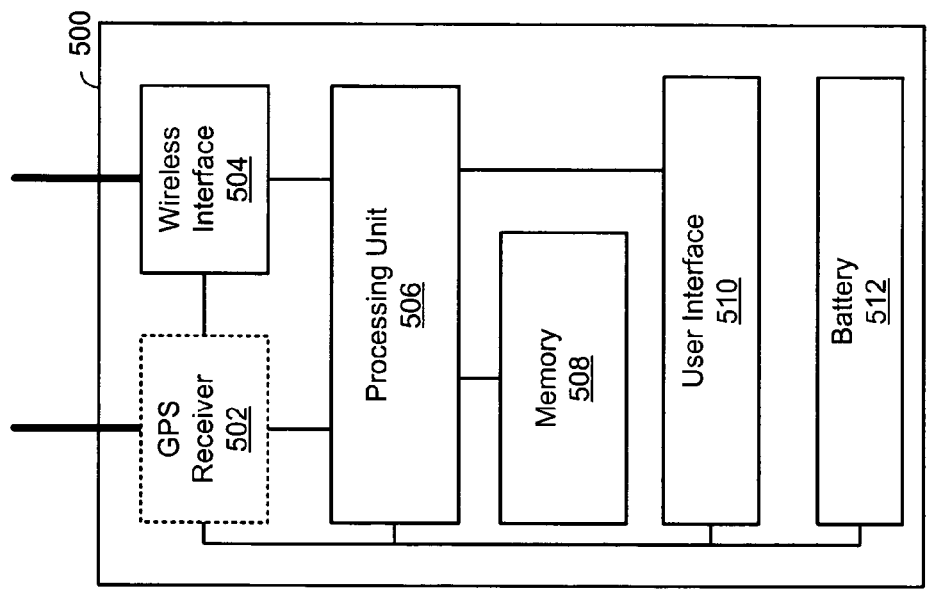
FIG. 5 is a block diagram illustrating a wireless terminal constructed and operating according to the present invention.

FIG. 5 is a block diagram illustrating a wireless terminal constructed and operating according to the present invention. As shown in FIG. 5, the wireless terminal 500 includes an optional GPS receiver 502, a wireless interface 504, processing unit 506, memory 508, user interface 510, and a battery 512. The components of the wireless terminal are typically contained within a hard case that provides protection from the elements. The structure of the optional GPS receiver 502 is known. The wireless interface 502 will have particular structure and functionality based upon the type of the wireless terminal 500. For example, when the wireless terminal is a cellular telephone, the wireless interface 504 will support a corresponding interface standard, e.g., GSM, CDMA, TDMA, FDMA, etc. The wireless interface 504 of the cellular telephone 504 may also/alternately support WLAN and/or WPAN functionality. When the wireless terminal is a WLAN terminal for example, the wireless interface 504 will support standardized communication according to the IEEE 802.11x group of standards, for example. When the wireless terminal is a WPAN device, the wireless interface 504 would support the Bluetooth interface standard or another WPAN standard such as the 802.15 standard. In any case, the wireless interface 504 may support all or a subset of cellular telephone, WLAN, and WPAN operations.

The processing unit 506 may include any type of processor such as a microprocessor, a digital signal processor, an application specific Integrated Circuit (ASIC), or a combination of processing type devices. The processing unit 506 is operable to execute a plurality of software instructions that are stored in memory 508 and downloaded for execution. The processing unit 506 may also include specialized hardware required to implement particular aspects of the present invention. Memory 508 may include SRAM, DRAM, PROM, flash RAM, or any other type of memory capable of storing data and instructions.

A user interface 510 may include a keypad, a screen, a touch screen, a voice recognition system, an optical recognition system that would authenticate a user's iris, for example, and/or any other type of interface that may be employed in the wireless terminal. In some embodiments, the user interface 510 may include therewith ability to service a headset including microphone and earpiece for the user. Battery 512 powers the components of the wireless terminal 500.

Figure 6:
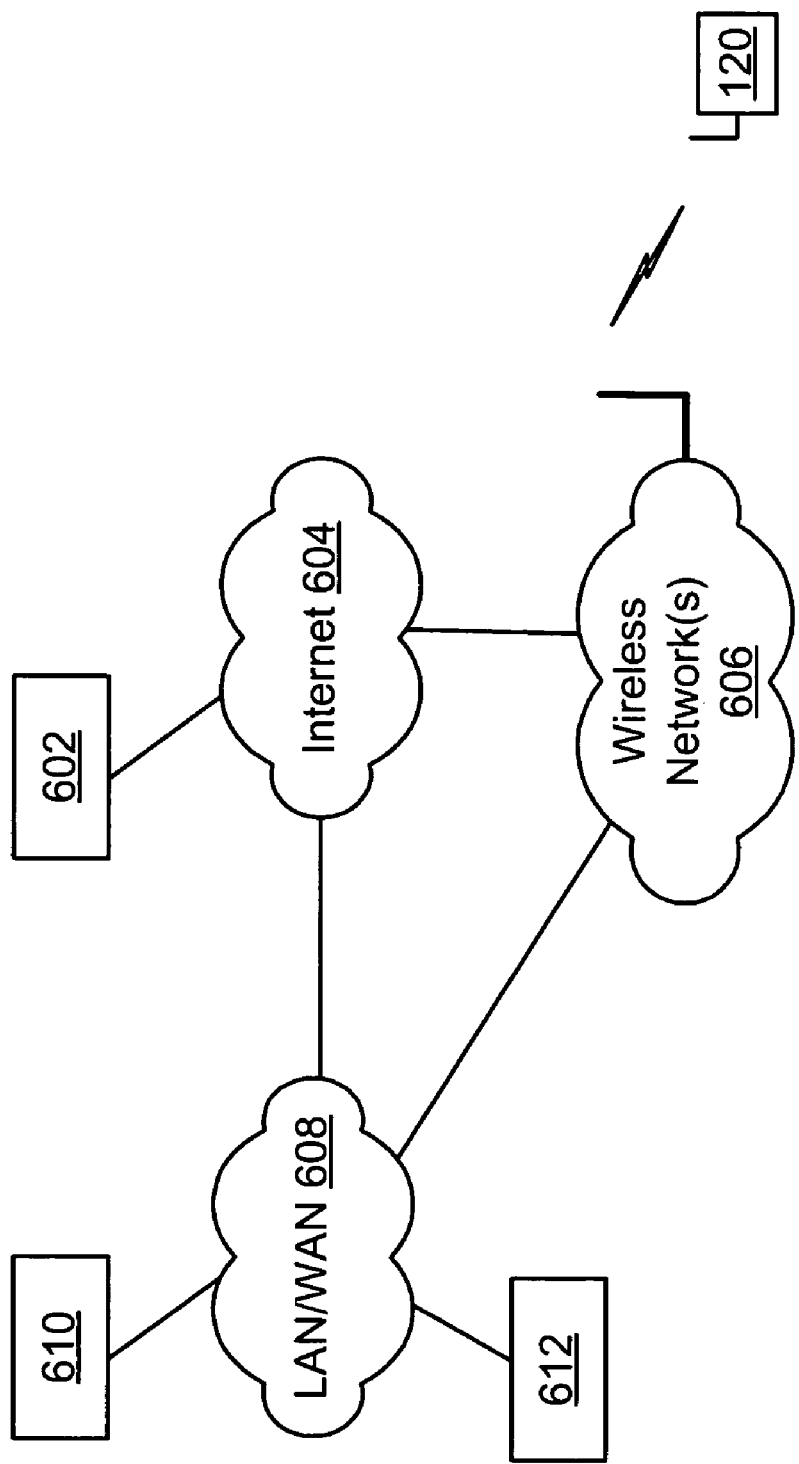
FIG. 6 is a block diagram illustrating a system that may be used to create location based access rules according to the present invention.

FIG. 6 is a block diagram illustrating a system that may be used to create location based access rules according to the present invention. The components of FIG. 6 are illustrated to further describe how a user may establish a plurality of location based access rules for a wireless terminal 120. The system of FIG. 6 includes a wireless network 606 that supports wireless communications with the wireless terminal 120. FIG. 6 also illustrates the Internet 602 and a LAN/WAN 608 that intercouples with the Internet 604 and the wireless network 606. A user of the wireless terminal may access a server computer 602 or 610 via a user terminal 612. The user terminal 612 may be a personal computer, laptop computer, or another type of device. According to an embodiment of the present invention, the user establishes a plurality of location based access rules via interaction with a server computer 602 or 612. The user employs the client computer 612 to access the server computer 602 or 610 to establish the plurality of location based access rules. Once this plurality location based access rule is established, it may be downloaded to the wireless terminal 120 via the LAN/WAN 608, Internet 604, and the wireless network 606.

In an alternate embodiment, the plurality of the location based access rules are stored in server computer 602 or 610. Thus, upon their implementation, the wireless terminal downloads them or accesses them via the wireless network 606, the Internet 604, and/or LAN/WAN 608. In such case, more wireless communications are required to implement the plurality location based access rules. However, in such case, it would be more difficult for a third party to illegally alter the plurality of location based access rules and would add an additional layer of security.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the terms "communicatively coupled" or "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents, and alternatives falling within the spirit and scope of the present invention as defined by the claims.

The invention claimed is:

1. A method for operating a wireless terminal comprising:
   receiving an operation request from a user;
   accessing a plurality of location based access rules based upon the operation request, each location based access rule of the plurality of location based access rules including a location parameter and corresponding authentication requirements;
   determining a location of the wireless terminal;
   selecting a location based access rule of the plurality of location based access rules based upon the location;
   determining whether the user has previously met the corresponding authentication requirements of the selected location based access rule, the user having previously met the corresponding authentication requirements of the selected location based access rule by the wireless terminal having previously determined its location and the wireless terminal having previously received authentication requirements from the user while at the previously determined location;
   prompting the user to meet the corresponding authentication requirements when the user has not previously met the corresponding authentication requirements of the selected location based access rule;
   when the user meets the corresponding authentication requirements of the selected location based access rule, satisfying the operation request; and
   when the user does not meet the corresponding authentication requirements of the selected location based access rule, denying the operation request.

2. The method of claim 1, wherein the operation request comprises at least one of:
   a request to access to a feature provided by the wireless terminal;
   a request to access to a servicing network via the wireless terminal;
   a request to access to a remote device via the wireless terminal; and
   a request to access functions provided by the wireless terminal including at least address directory functions, calendar functions, and application program functions.

3. The method of claim 1, wherein the wireless terminal comprises one of a cellular telephone, a Wireless Personal Area Network (WPAN) terminal, and a Wireless Local Area Network (WLAN) terminal.

4. The method of claim 1, wherein determining the location of wireless terminal comprises accessing a Global Positioning System (GPS) receiver of the wireless terminal.

5. The method of claim 1, wherein determining the location of wireless terminal comprises:
   accessing a servicing wireless network;
   sending a location determination request message to the servicing wireless network; and
   receiving a location determination response message from the servicing wireless network that includes the location.

6. The method of claim 1, further comprising interacting with the user to establish the plurality of location based access rules.

7. The method of claim 6, further comprising:
   the user establishing the plurality of location based access rules via interaction with a server computer communicatively coupled to the wireless terminal; and
   the server computer downloading the plurality of location based access rules to the wireless terminal.

8. The method of claim 1, wherein the operation request is to access information stored by the wireless terminal.

9. A method for operating a wireless terminal comprising:
   receiving an operation request from a user;
   accessing a plurality of location based access rules based upon the operation request, each location based access rule of the plurality of location based access rules including a location parameter and an access flag;
   determining a location of the wireless terminal;
   selecting a location based access rule of the plurality of location based access rules based upon the location, the location based access rule having a selected access flag;
   when the selected access flag compares favorably to an access flag rule, determining that the user has previously met corresponding authentication requirements of the selected location based access rule and satisfying the operation request, the user having previously met the corresponding authentication requirements of the selected location based access rule by the wireless terminal having previously determined its location and the wireless terminal having previously received authentication requirements from the user while at the previously determined location;
   when the selected access flag does not compare favorably to the access flag rule:
     prompting the user to meet the corresponding authentication requirements of the selected location based access rule;
     receiving a response front the user;
     upon a favorable response setting the selected access flag and satisfying the operation request; and
     upon a non-favorable response, denying the operation request.

10. The method of claim 9, wherein the operation request comprises at least one of:
    a request to access to a feature provided by thy wireless terminal;
    a request to access to a servicing network via the wireless terminal;
    a request to access to a remote device via the wireless terminal; and
    a request to access functions provided by the wireless terminal including at least address directory functions, calendar functions, and application program functions.

11. The method of claim 9, wherein the wireless terminal comprises one of a cellular telephone, a Wireless Personal Area Network (WPAN) terminal, and a Wireless Local Area Network (WLAN) terminal.

12. The method of claim 9, wherein determining the location of wireless terminal comprises accessing a Global Positioning System (CPS) receiver of the wireless terminal.

13. The method of claim 9, wherein determining the location of wireless terminal comprises:
    accessing a servicing wireless network;
    sending a location determination request message to the servicing wireless network; and
    receiving a location determination response message from the servicing wireless network that includes the location.

14. The method of claim 9, further comprising interacting with the user to establish the plurality of location based access rules.

15. The method of claim 14, further comprising:
the user establishing the plurality of location based access rules via interaction with a server computer communicatively coupled to the wireless terminal; and
the servicing wireless network sewer downloading the plurality of location based access rules to the wireless terminal.

16. A wireless terminal comprising:
a wireless interface;
a user interface; and
a processing unit communicatively coupled to the wireless interface and to the user interface, wherein the processing unit is operable to:
receive an operation request from a user via the user interface;
accessing a plurality of location based access rules based upon the operation request, each location based access rule of the plurality of location based access rules including a location parameter and corresponding authentication requirements;
determine a location of the wireless terminal;
select a location based access rule of the plurality of location based access rules based upon the location;
determine whether the user has previously met the corresponding authentication requirements of the selected location based access rule the user having previously met the corresponding authentication requirements of the selected location based access rule by the wireless terminal having previously determined its location and the wireless terminal having previously received authentication requirements from the user while at the previously determined location;
prompt the user to meet the corresponding authentication requirements when the user has not previously met the corresponding authentication requirements of the selected location based access rule;
when the user meets the corresponding authentication requirements of the selected location based access rule, satisfy the operation request; and
when the user does not meet the corresponding authentication requirements of the rejected location based access rule, deny the operation request.

17. The wireless terminal of claim 16, wherein the operation request comprises at least one of:
a request to access to a fracture provided by the wireless terminal;
a request to access to a servicing network via the wireless terminal;
a request to access to a remote device via the wireless terminal; and
a request to access functions provided by the wireless terminal including at least address directory functions, calendar functions, and application program functions.

18. The wireless terminal of claim 16, wherein the wireless terminal comprises one of a cellular telephone, a Wireless Personal Area Network (WEAN) terminal, and a Wireless Local Area Network (WLAN) terminal.

19. The wireless terminal of claim 16, further comprising a Global Positioning System (GPS) receiver communicatively coupled to the processor that the processor accesses to determine the location of the wireless terminal.

20. The wireless terminal of claim 16, wherein determining the location of wireless terminal comprises:

accessing a servicing wireless network;
sending a location determination request message to the servicing wireless network; and
receiving a location determination response message from the servicing wireless network that includes the location.

21. The wireless terminal of claim 16, wherein the processing unit is further operable to interact with the user to establish the plurality of location based access rules.

22. The wireless terminal of claim 16, wherein the processing unit is further operable to download the plurality of location based access rules to the wireless terminal via the wireless interface.

23. The wireless terminal of claim 16, wherein the operation request requests access to information stored by the wireless terminal.

24. A wireless terminal comprising:
a wireless interface;
a user interface; and
a processing unit communicatively coupled to the wireless interface and to the user interface, wherein the processing unit is operable to:
receive an operation request from a user via the user interface;
access a plurality of location based access rules based upon the operation request, each location based access rule of the plurality of location based access rules including a location parameter and an access flag;
determine a location of the wireless terminal;
select a location based access rule of the plurality of location based access rules based upon the location, the location based access rule having a selected access flag;
when the selected access flag compares favorably to an access flag rule, determine that the user has previously met corresponding authentication requirements of the selected location based access rule and satisfying the operation request the user having previously met the corresponding authentication requirements of the selected location based access rule by the wireless terminal having previously determined its location and the wireless terminal having previously received authentication requirements from the user while at the previously determined locator location;
when the selected access flag does not compare favorably to the access flag rule;
prompt the user to meet the corresponding authentication requirements of the selected location based access rule;
receive a response from the user;
upon a favorable response, set the selected access flag and satisfy the operation request; and
upon a non-favorably response, deny the operation request.

25. The wireless terminal of claim 24, wherein the operation request comprises at least one of:
a request to access to a feature provided by the wireless terminal;
a request to access to a servicing network via the wireless terminal;
a request to access to a remote device via the wireless terminal; and
a request to access functions provided by the wireless terminal including at least address directory functions, calendar functions, and application program functions.

26. The wireless terminal of claim 24, wherein the wireless terminal comprises one of a cellular telephone, a Wireless Personal Area Network (WPAN) terminal, and a Wireless Local Area Network (WLAN) terminal.

27. The wireless terminal of claim 24, further comprising a Global Positioning System (GPS) receiver communicatively coupled to the processor that the processor accesses to determine the location of the wireless terminal.

28. The wireless terminal of claim 24, wherein determining the location of wireless terminal comprises:
  accessing a servicing wireless network;
  sending a location determination request message to the servicing wireless network; and
  receiving a location determination response message from the servicing wireless network that includes the location.

29. The wireless terminal of claim 24, wherein the processing unit is further operable to interact with the user to establish the plurality of location based access rules.

30. The wireless terminal of claim 24, wherein the processing unit is further operable to download the plurality of location based access rules to the wireless terminal via the wireless interface.

* * * * *